United States Patent
Arce, Jr.

(10) Patent No.: US 6,508,368 B1
(45) Date of Patent: Jan. 21, 2003

(54) SYSTEM FOR REMOVABLY SECURING KITCHEN UTENSILS OVER A KITCHEN SINK

(76) Inventor: Arcadio Arce, Jr., 2200 N. Avers, Chicago, IL (US) 60647

( * ) Notice: Subject to any disclaimer, the term of this patent is extended or adjusted under 35 U.S.C. 154(b) by 0 days.

(21) Appl. No.: 09/772,258

(22) Filed: Jan. 29, 2001

(51) Int. Cl.$^7$ .............................. A47G 29/087
(52) U.S. Cl. ............... 211/41.3; 211/41.1; 211/85.25; 108/24; 108/25; 269/289 R
(58) Field of Search ..................... 211/41.3, 41.1, 211/41.4, 41.5, 41.6, 85.25; D7/667, 698, 55; 269/302.1, 289 R; 108/24, 25, 27

(56) References Cited

U.S. PATENT DOCUMENTS

| | | | |
|---|---|---|---|
| 1,389,908 A | * | 9/1921 | Shults et al. ............... 211/153 |
| 1,643,906 A | | 1/1927 | Russel |
| 2,963,957 A | * | 12/1960 | Tashman ..................... D7/698 |
| 3,030,994 A | * | 4/1962 | Wysowski ................... D7/698 |
| D203,849 S | * | 2/1966 | Nevai .......................... D7/698 |
| 4,033,461 A | | 7/1977 | Nevai |
| 4,041,964 A | | 8/1977 | Shmoon |
| D254,529 S | * | 3/1980 | Arnoff ......................... D7/698 |
| 4,243,184 A | | 1/1981 | Wright |
| 4,456,021 A | | 6/1984 | Leavens |
| 4,765,603 A | | 8/1988 | Huppert |
| 5,016,298 A | | 5/1991 | Ris et al. |
| D317,551 S | | 6/1991 | King |
| D335,799 S | | 5/1993 | Jong |
| 5,312,178 A | | 5/1994 | King |
| 5,363,755 A | | 11/1994 | Liang |
| D359,664 S | | 6/1995 | Alley |
| 5,560,288 A | | 10/1996 | Licari |
| 5,904,271 A | | 5/1999 | Collins et al. |
| D415,661 S | | 10/1999 | Georgeovich |
| 6,129,344 A | * | 10/2000 | Yang ...................... 269/289 R |

FOREIGN PATENT DOCUMENTS

JP   2000265516 A   *   9/2000   ............ E03C/1/18

* cited by examiner

Primary Examiner—Daniel P. Stodola
Assistant Examiner—Erica B Harris
(74) Attorney, Agent, or Firm—Michael R. McKenna

(57) ABSTRACT

A system for removably securing kitchen utensils over a kitchen sink comprises a generally planar board for cutting with a rotatable spit and an elongated frame with a recess for receiving removably securable kitchen utensils, including the generally planar board for cutting.

23 Claims, 7 Drawing Sheets

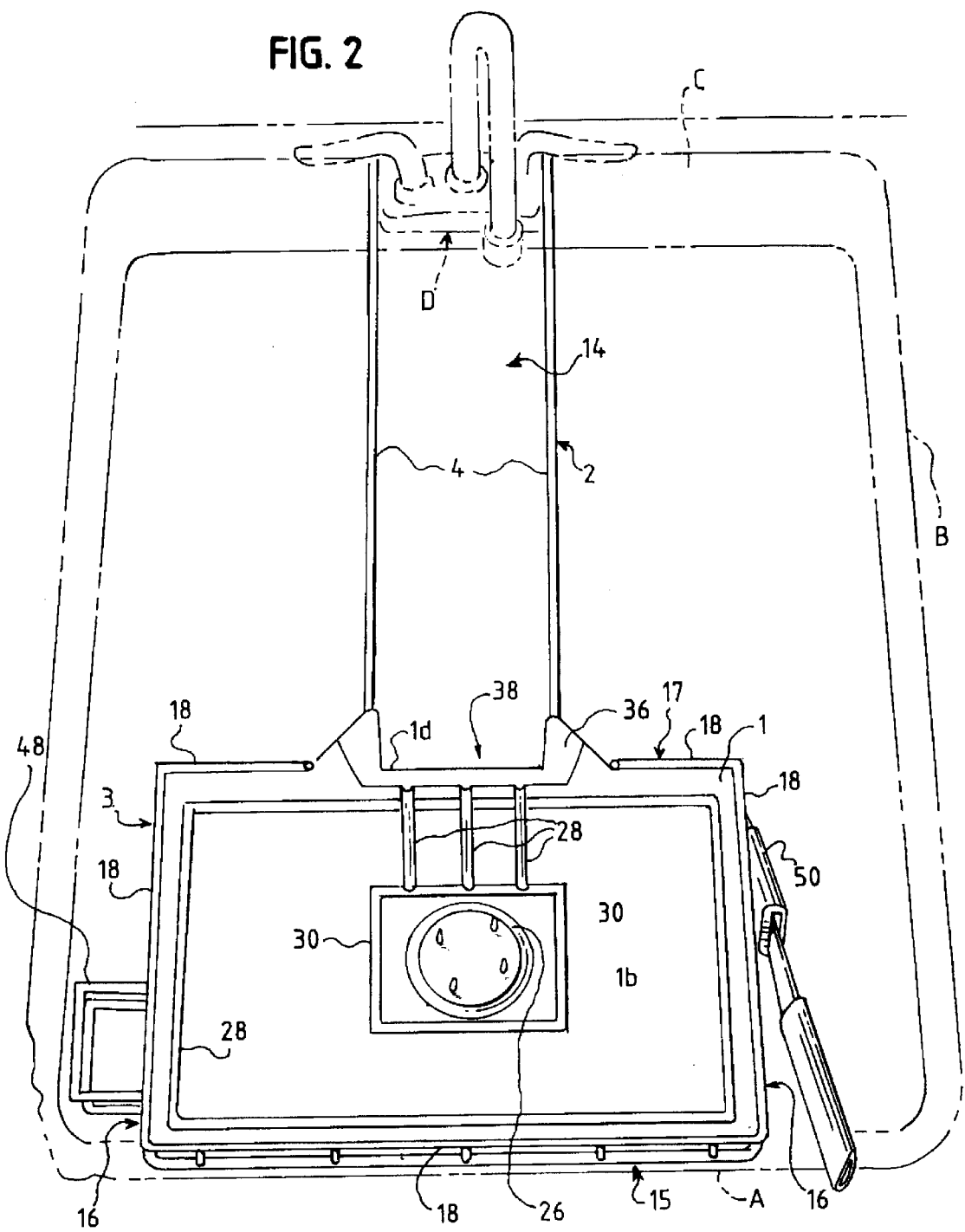

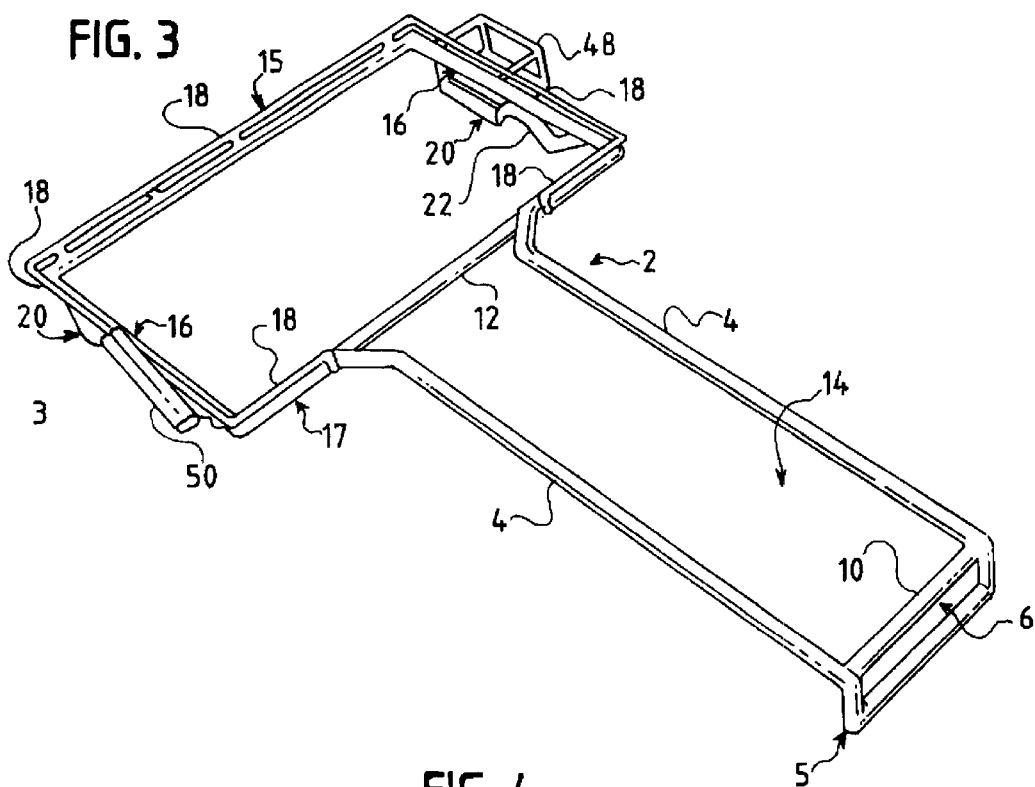
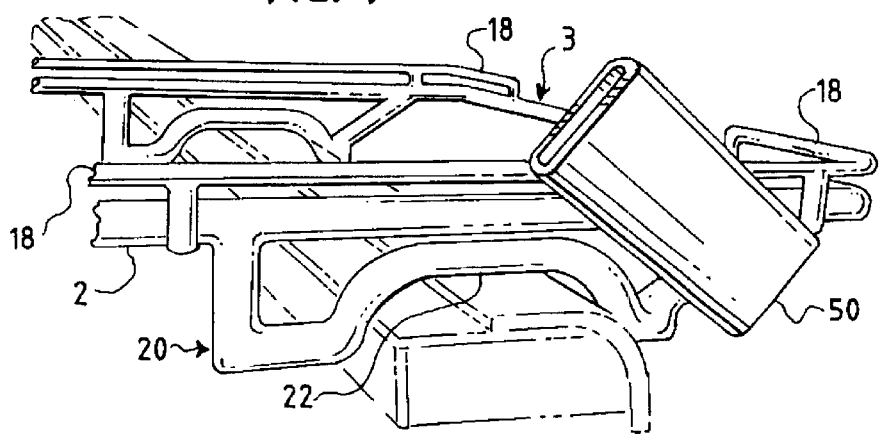
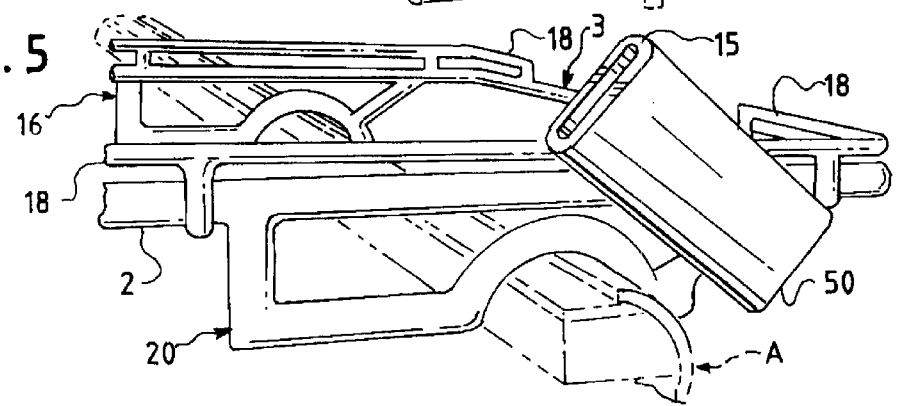

SYSTEM FOR REMOVABLY SECURING KITCHEN UTENSILS OVER A KITCHEN SINK

BACKGROUND OF THE INVENTION

This invention relates to a system for removably securing kitchen utensils over a kitchen sink comprising a generally planar board for cutting, preferably with a rotatable spit disposed on one side, and an elongated frame with a recess for receiving removably securable kitchen utensils, including the generally planar board for cutting.

Alternative technology is available in the form of a U.S. Pat. No. 5,016,298 issued in 1991 to Ris et al. for an accessory set for kitchen sinks comprising substantially a cutting board that is suitably contoured to fit within the periphery of a sink. The cutting board has a cut-out portion adapted to receive and secure one side of a colander with the other side of a colander secured on the remaining free portion of edge of the sink.

Also see U.S. Pat. No. 4,243,184 issued to Wright in 1981 for a cutting board with a built in grating device that can be positioned flat or elevated upwardly. U.S. Pat. No. 4,765,603 issued to Huppert in 1988 for a cutting board discloses a cutting board that is suspended over a part of the sink, with four extended members to lay on the top lip of the sink; U.S. Pat. No. 4,041,964 issued to Shamoon in 1977 for a kitchen cutting board comprising a cutting surface that lays over the sink with an open bottomed mesh recess to toss the waste into the trash; and U.S. Pat. No. 5,312,178 issued to King in 1994 for a knife rack and cutting board comprising a piece to support a cutting board and knife holder that suspends over the sink.

Additionally, U.S. Pat. No. 5,363,755 issued to Liang in 1994 for a combination of utensils that provides for a table that can receive a chopping board, a mandolin/grater, and baskets for collecting debris. As shown in FIG. 6 of Liang, two handles 18 can be slidably inserted to engage the table in a sink.

Furthermore, U.S. Pat. No. 4,456,021 issued in 1984 to Leavens for a sink having a cutting board that is supported by the top edge of the sink and a colander that is supported on rails beneath the cutting board for collecting debris.

The citation of the foregoing publications is not an admission that any particular publication constitutes prior art, or that any publication alone or in conjunction with others, renders unpatentable any pending claim of the present application. None of the cited publications is believed to detract from the patentability of the claimed invention.

ADVANTAGES OF THIS INVENTION

Unlike the foregoing devices which teach rigid structures including some that require customized configurations and/or reconfiguration tools, the system of the instant invention for removably securing kitchen utensils over a kitchen sink can be placed and secured over the kitchen sink. This can be accomplished without the need for any extraneous tools. Moreover, this system brings the cutting board in close proximity to the user where it is most functional, slidably secures a variety of baskets adjacent to the cutting board where they can receive foods that have been worked on by the user on the cutting board, and this integrated and yet flexible system mates the cutting board to the baskets using a cutting board recess adapted to receive a flange of the basket. Additionally, the utensils are uniquely arranged so that a draining basket can be disposed under the water from the faucet of the sink where foods can be washed as well as drained. The draining basket is further arranged so that sufficient clearance between it and the cutting board allows wastes from the cutting board to be removed into the sink without interference from the draining basket.

A novel rotary spit for securing meats to be carved and the like is provided on one side of the cutting board. Since the cutting board can be flipped over, it can have a flat cutting surface or a surface with the rotary spit disposed on top in the frame. All of the utensils of this highly integrated system can be removed from the frame and washed or otherwise handled separately.

The frame of the device may be secured preferably over the center of a kitchen sink with a distal end of the frame set over the faucet. This allows some of the basket utensils to be disposed under the spout of the faucet for rinsing food stuffs. The proximal end of the frame contains a cutting board and rests on the proximal sink edge and counter top edge. The cutting board preferably has a raised surface for cutting on one side and a rotating spit disposed on the other side. The rotating spit is designed for holding meats and other food stuffs requiring a secure and rotatable position for carving and the like. Drain grooves are provided on the surface associated with the spit for the removal of excess juices or liquids. The cutting board preferably has a c-shaped flange extending from one edge which rests on the frame and is designed to mate with the flange of the upper flange of a basket supported by the frame.

Provided with the utensils is a double basket for holding vegetables. This basket is suitable for draining washed vegetables and fruits. Under a lateral flange of each basket there is an elongated half sleeve that comes to rest on the extended legs of the frame.

One or more of the large baskets may have a cover and also a separate rim frame that can be secured on top of the basket. It has an opening that is suitable for receiving and holding a slicer, grater, or other cutting mechanism. The position of the basket, as illustrated in FIG. 1, aids in the use of the slicing/dicing mechanism as it is an arms length distance from the user being disposed on or near the distal end of the cutting board. The double basket may be used for temporary storage of food stuffs after they have been washed. The preferred open structure of the walls permits draining and airing of the food stuff materials. The double baskets are sized so that they can be at a spaced distance from the cutting board disposed in the frame so waste materials can be moved from the cutting board into the sink without interference of the double baskets. Since the system is preferably located over the sink, waste materials and drainage can flow directly into the garbage disposal via the sink while food is being prepared.

The frame is preferably made out of wood, plastic or other suitably strong and rigid materials for this intended purpose. The material of construction for the frame member may have some inherent flexure and yet be strong enough for its intended purposes. The system is conceived of as being lightweight so that it can be handled by the most diminutive kitchen user.

The cutting board has an elevated surface that is of sufficient thickness to provide lasting wear. Also the additional raised height on at least one surface accommodates the proximal end of the rim flange on a basket so that the cutting board is at the same elevation as the slicer, which aids in the slicing/grating process. The basket supporting the slicer is preferably constructed with perforated walls to allow for drainage.

Even when the framing device is not centrally disposed over the sink, it is preferably disposed over a sink in sufficient proximity to the faucet to allow the faucet to wash materials in the double basket. The double basket has proximal arms extending from it so that this spaced relationship between the board and the basket can be maintained regardless of the size of any medial box. The basket additionally has a horizontal ledge disposed proximally, which adds further access to the food stuff to be tended.

Still other advantages will be apparent from the disclosure that follows.

SUMMARY OF THE INVENTION

The invention relates to a system for removably securing kitchen utensils over a kitchen sink comprising a generally planar board for cutting having a rotatable spit disposed on one side thereof and means for usably securing over a kitchen sink at least one utensil, including the generally planar board for cutting. Alternatively, the system includes a generally planar board for cutting, a draining basket with open latticed walls and a horizontal shelf extending proximally from a rim thereof, and means for usably securing over a kitchen sink a plurality of utensils including the generally planar board for cutting and the draining basket, with the draining basket disposed at a spaced distance from the cutting board that is sufficient to allow any waste materials from an upper surface of the cutting board to be directed off the cutting board and into the kitchen sink free of obstruction by the draining basket.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWING

Preferred embodiments of the invention are described hereinafter with reference to the accompanying drawing wherein:

FIG. 2 shows the elongated frame of the present invention centrally disposed over the bowl of the kitchen sink (shown in phantom), with the extended legs of the frame disposed around the faucet and further with a rotating spit side of the cutting board disposed upwardly;

FIG. 3 is a perspective view of the elongated frame of the present invention showing in particular an upward rail surrounding the section of the frame for receiving the cutting board;

FIG. 4 is a fragmentary perspective view of the proximal end of the frame of the system for removably securing kitchen utensils over a kitchen sink of the present invention showing a downwardly disposed brace resting on an extended sink counter top edge;

FIG. 5 is a fragmentary perspective view of the proximal end of the frame of the system for removably securing kitchen utensils over a kitchen sink of the present invention showing the downwardly disposed brace resting on a sink counter top edge;

DETAILED DESCRIPTION OF THE INVENTION

Figure 1:
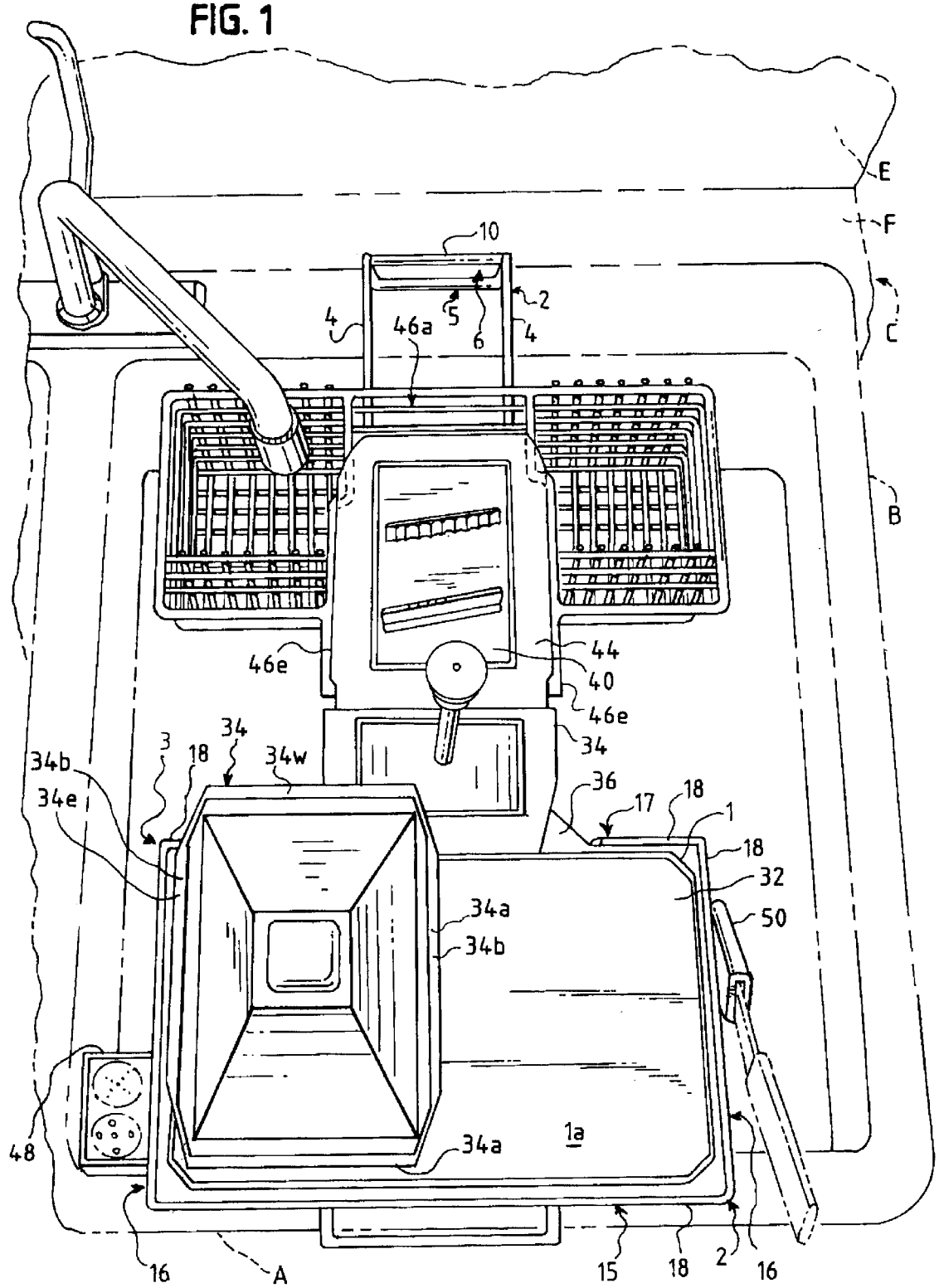
FIG. 1 is a perspective view of the system for removably securing kitchen utensils over a kitchen sink of the present invention showing an elongated frame, disposed over one bowl of a two bowl kitchen sink (shown in phantom), with a latticed double basket disposed distally, a basket securing a rim frame and grater/slicer disposed adjacent to the double basket, and with a cutting board disposed proximally in the elongated frame and a basket disposed in a distal recess, and further showing another basket and cover disposed on top of the cutting board.

The preferred embodiments depicted in the drawing comprise a system for removably securing kitchen utensils over a kitchen sink comprising a generally planar board for cutting that has a rotatable spit disposed on one side thereof and means for usably securing over a kitchen sink at least one utensil including the generally planar board for cutting.

Another preferred embodiment of the system for removably securing kitchen utensils over a kitchen sink comprises a generally planar board for cutting, a draining basket with open latticed walls and a horizontal shelf extending proximally from a rim thereof, and means for usably securing over a kitchen sink a plurality of utensils including the generally planar board for cutting and the draining basket. In this embodiment, the draining basket is disposed at a spaced distance from the cutting board with the spaced distance being sufficient to allow any waste materials from an upper surface of the cutting board to be directed off the cutting board and into the kitchen sink free of obstruction by the draining basket.

Without departing from the generality of the invention disclosed herein and without limiting the scope of the invention, the discussion that follows, will refer to the invention as depicted in the drawing.

The preferred embodiments of the apparatus depicted in the drawing, as shown in FIG. 1, comprise a system for removably securing kitchen utensils over a kitchen sink. There is provided a plurality of removably securable kitchen utensils including a generally planar board 1 for cutting, and an elongated frame 2 having a proximal end and a distal end with a tray-like frame section 3 disposed adjacent to the proximal end thereof with a pair of horizontal, spaced apart, parallel legs 4 extending distally from the tray-like frame section 3. The elongated frame further has a lateral member 10 connecting the pair of parallel legs 4 at the respective distal ends thereof. The pair of spaced apart parallel legs extends distally from opposite ends of a first segment 12 of the tray-like frame section, as shown in FIG. 3.

Throughout this description, the term proximal and proximal end refer to that portion of the device that is closer to the user. As shown in FIG. 1 of the drawing, the proximal end is at the bottom and the distal end, being the end further away from the user, is shown at the top of said figure.

The first segment 12 of the tray-like frame section, each of the pair of spaced apart parallel legs 4, and the lateral member 10 define a recess 14 for receiving at least one of the plurality of removably securable kitchen utensils independent of the generally planar board 1 for cutting.

The tray-like frame section 3 has a proximal border 15, a distal border 17 and a pair of interconnecting lateral borders 16, and a raised railing 18 extending along at least a portion of each border of the tray-like frame section for receiving the generally planar board for cutting and a pair of downwardly extending braces 20 for supporting the proximal end of the elongated frame over a proximal member (A) of the kitchen sink (B). The distal end the elongated frame 2 is disposed over a distal member (C) of the kitchen sink. Each of the proximal and distal members of the kitchen sink includes at least one of a portion of the counter top and a portion of the rim of the sink.

Preferably, each of the pair downwardly extending braces 20 has a bottom edge with a concave section 22 that is suitably sized to straddle a proximal member (A) of the kitchen sink to limit longitudinal movement of the elongated frame. Additionally, the lateral member 10 may extend over and around an upright fixture (D) of the kitchen sink to limit longitudinal movement of the elongated frame. The upright fixture (D) comprises at least one of a faucet handle, a spout, and a nozzle with an extensible flexible hose.

Another preferred aspect of the system for removably securing kitchen utensils over a kitchen sink requires the elongated frame 2 to have a flange 5 that extends downwardly from the lateral member 10. The flange 5 can be disposed between an upright fixture (D) of the kitchen sink and one of a distal kitchen wall (E) and a counter splashboard (F). The flange 5 extending downwardly from the lateral member may also have an aperture 6, which can receive a protuberance of the upright fixture (D).

In another preferred feature of the system for removably securing kitchen utensils over a kitchen sink, at least one of the pair of spaced apart parallel legs 4 has a radially extending slidable bracket 7 that is moveable axially relative to the at least one of the pair of spaced apart parallel legs 4, the slidable bracket 7 further has a lock comprising a tapered clamp 8 to suppress axial movement. In this way, the radially extending slidable bracket 7 can be moved along the axis of the leg 4 to contact a vertical side wall of the kitchen sink and then locked in place to restrict further axial movement, thereby limiting longitudinal movement of the elongated frame.

Figure 6:
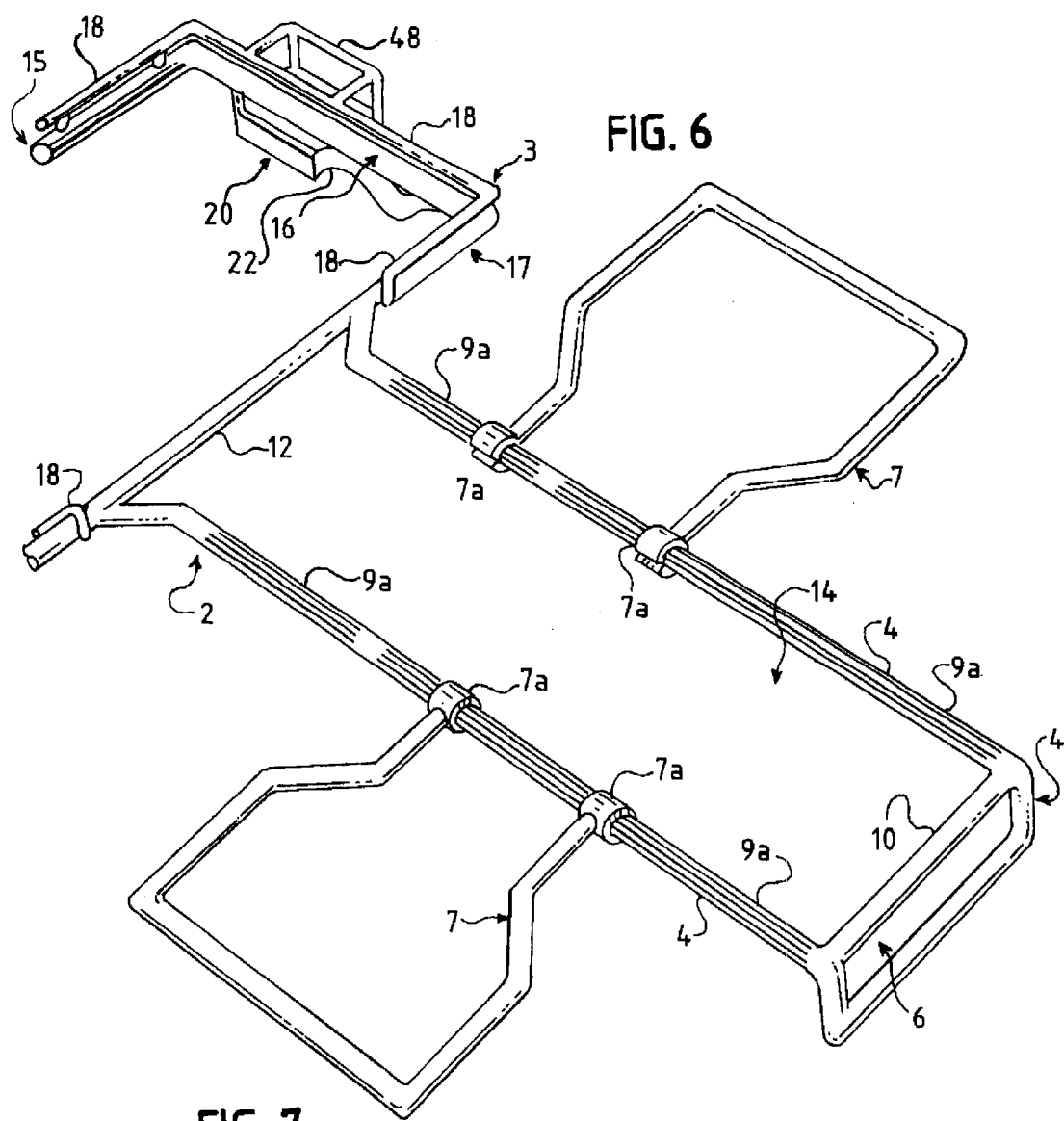
FIG. 6 is a perspective view of the frame of the system for removably securing kitchen utensils over a kitchen sink of the present invention showing slidable brackets disposed thereon.
Figure 7:
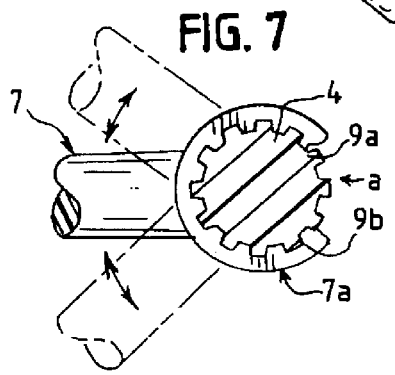
FIG. 7 is a fragmentary side elevation view of the system for removably securing kitchen utensils over a kitchen sink of the present invention taken along the line of 7—7 of FIG. 6 showing the ridges and grooves of a pivot locking mechanism.

The radially extending, slidable bracket 7 may further be pivotally moveable about the axis of the at least one of the pair of spaced apart parallel legs 4 from which it extends and it may be pivoted to contact a lateral vertical side wall of the kitchen sink. It has a pivot lock 9 to restrict pivotal movement when the slidable bracket is in contact with the lateral vertical side wall of the kitchen sink and thereby limit lateral movement of the elongated frame. As shown in FIGS. 6 and 7, the pivot lock 9 has at least one ridge 9a extending along selected portions of the at least one of the pair of spaced apart parallel legs 4 and a corresponding number of parallel grooves 9b disposed on an internal surface of a connecting ring 7a of the slidable bracket 7.

As best shown in FIGS. 1 and 2, the generally planar board for cutting I has a first generally planar side 1a and a second generally planar side 1b with a rotatable spit 26 disposed thereon. The rotatable spit is disposed on a central region 1c of the second generally planar side 1b of the cutting board 1 and the second generally planar side has a plurality of interconnected drain grooves 28 that terminate proximate a distal edge 1d of the cutting board disposed thereon. The plurality of interconnected drain grooves include a series of centrally disposed drain grooves 30 bounding the central region for collecting and transferring any draining liquid from the central region 1c thereof.

Another preferred feature of the system for removably securing kitchen utensils over a kitchen sink has the first generally planar side 1a with a uniform raised surface 32, as shown in FIG. 1.

The kitchen utensils may include at least one preparation basket 34 having a rim flange 34a extending horizontally disposed in the recess 14 for receiving at least one of the plurality of removably securable kitchen utensils. The rim flange 34a has opposite lateral portions 34b that are adapted to be supported by the pair of spaced apart parallel legs 4. Each of the opposite lateral portions of the rim flange may further have an inverted channel 34c that is open along the bottom and with an inner cylindrical surface adapted to slidably receive one of the pair of spaced apart parallel legs 4.

In another preferred embodiment, each of the first generally planar side and second generally planar side has a surface recess 36 extending along a central portion of a distal edge 1d that is suitably sized to receive the rim flange 34a disposed on a proximal end of the at least one preparation basket 34. The central portion of the distal edge may further have a concavity 38 that is suitably sized to receive the proximal end of the at least one preparation basket 34 below the rim flange 34a.

For removably securing kitchen utensils, including slicers 40 and graters 42, the system of this important invention comprises an adapter frame 44 for securing a utensil to the preparation basket. The adapter frame has a downward extending flange 44a that fits the preparation basket and further has an opening 44b suitably sized to receive one of a slicer 40 and a grater 42.

Figure 9:
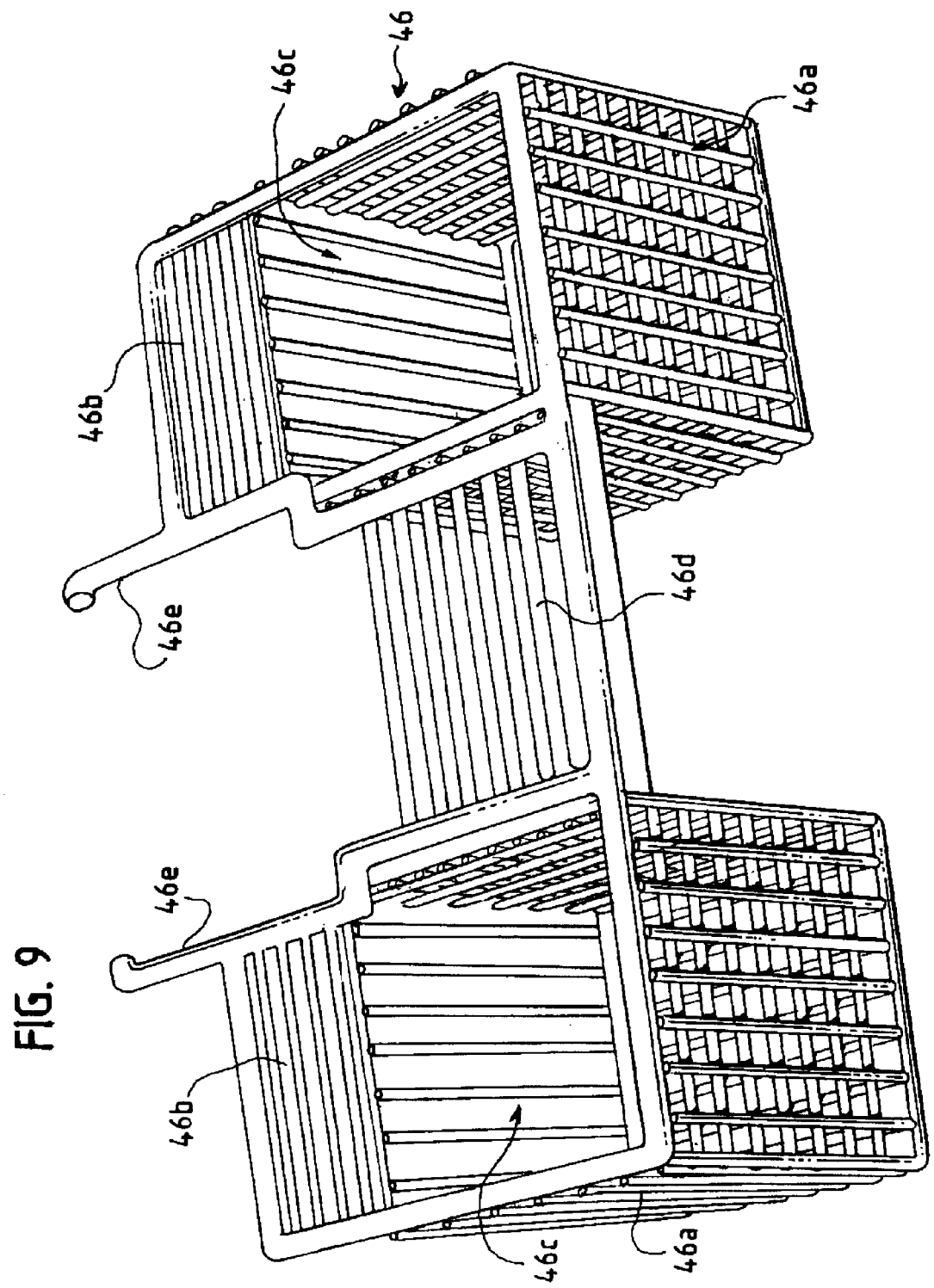
FIG. 9 is a perspective view of the system for removably securing kitchen utensils over a kitchen sink of the present invention showing a double draining basket.
Figure 10:
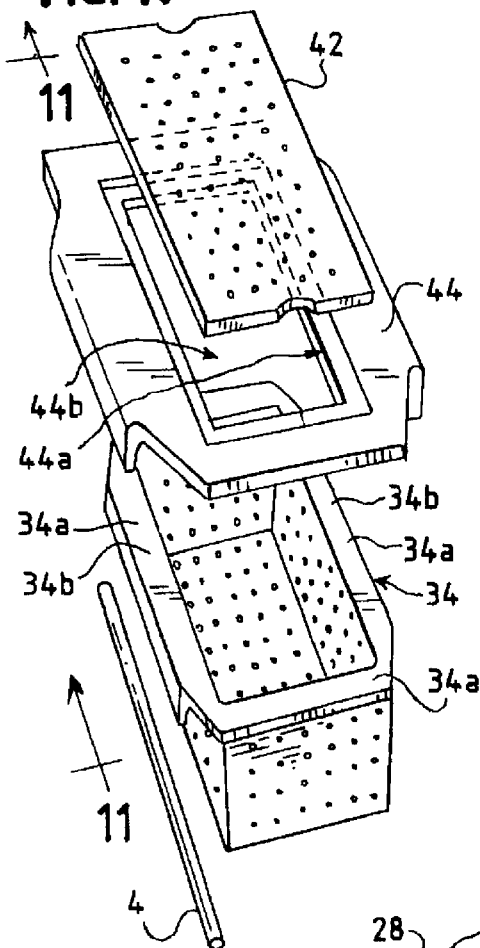
FIG. 10 is an exploded perspective view of the system of the present invention showing a basket with an adapter frame that holds a grater with the basket having lateral flanges that respectively rest on the extended legs of the frame.
Figure 11:
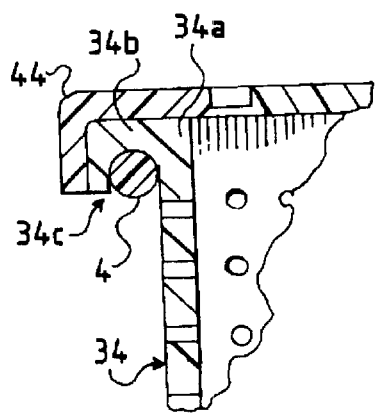
FIG. 11 is a side elevation view of the system for removably securing kitchen utensils over a kitchen sink of the present invention taken along the line 11—11 of FIG. 10 showing particularly an inverted channel on the lateral flanges of the basket which is supported by the extended legs of the frame.
Figure 12:
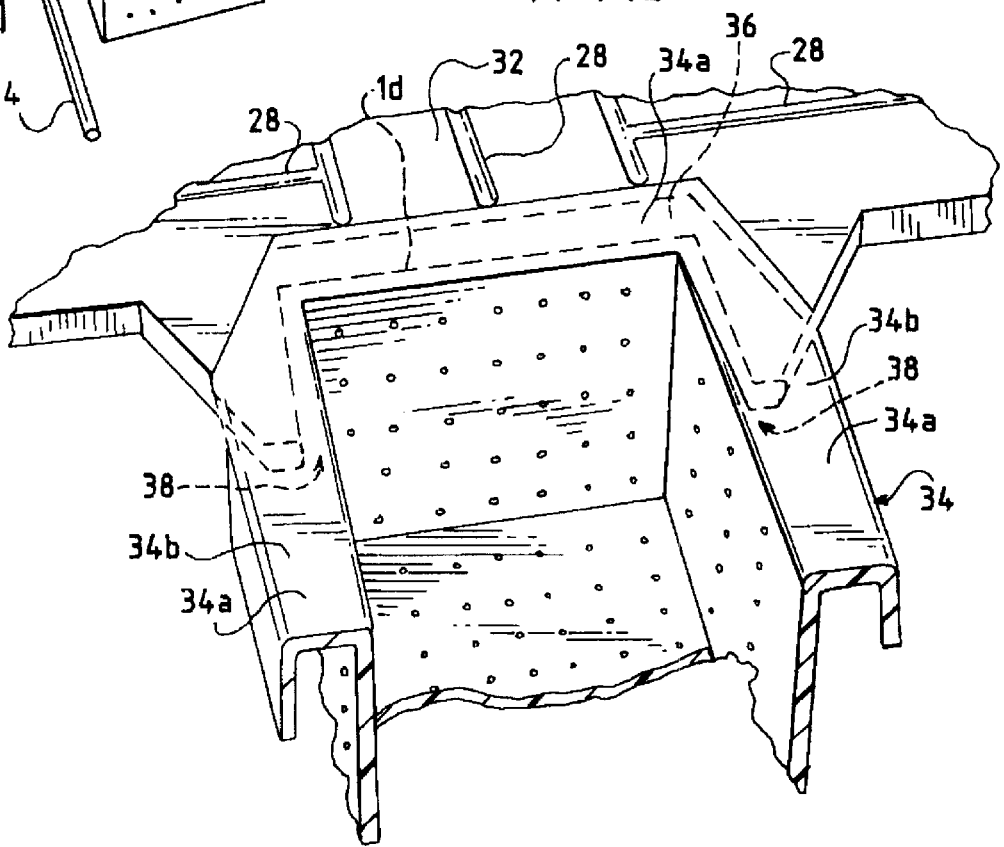
FIG. 12 is a perspective view of the system for removably securing kitchen utensils over a kitchen sink of the present invention showing the mating relationship between the recess on the distal edge of the cutting board and the flange of the basket.

The system for removably securing kitchen utensils over a kitchen sink will preferably include a draining basket 46 with open latticed walls 46a and a horizontal shelf 46b extending proximally from a rim thereof, as shown in FIGS. 1 and 9. The draining basket 46 is disposed on the frame 2 at a spaced distance from the cutting board 1. The spaced distance is sufficient to allow any waste materials from an upper surface of the cutting board 1 to be directed off the cutting board and into the kitchen sink free of obstruction by the draining basket. Preferably, the draining basket may comprise a pair of bowls 46c interconnected by a horizontal bridge 46d suitably sized to straddle a section of the pair of spaced apart parallel legs 4. Moreover, the draining basket may further comprise a pair of spaced apart proximally extending parallel horizontal arms 46e, the arms are at a spaced arm distance equivalent to a spaced legs distance between the pair of spaced apart parallel legs 4. In this way, a suitably sized preparation basket 34 having a rim flange 34a extending horizontally with opposite lateral portions can be supported by the arms 46e of the draining basket 46.

As shown in FIG. 1 of the drawing, the elongated frame may comprise at least one of a utensil for holding seasoning containers 48, a knife sheath 50, a grater 42 and a slicer 40. The kitchen utensils including a grater and a slicer are preferably provided as part of the system.

Included in a preferred embodiment of the system for removably securing kitchen utensils over a kitchen sink are a plurality of removably securable kitchen utensils and an elongated frame 2. The plurality of removably securable kitchen utensils includes a generally planar board for cutting 1 that has a first generally planar side 1a and a second generally planar side 1b with a rotatable spit 26 disposed on a central region 1c of the second generally planar side 1b of the cutting board. The second generally planar side has a plurality of interconnected drain grooves 28 disposed thereon that terminate proximate a distal edge of the cutting board. The plurality of interconnected drain grooves includes a series of centrally disposed drain grooves 30 bounding the central region 1c for collecting and transferring any draining liquid from the central region.

The elongated frame has a proximal end and a distal end with a tray-like frame section 3 disposed adjacent to the proximal end thereof and a pair of horizontal spaced apart parallel legs extending distally from the tray-like frame section. The elongated frame 2 further has a lateral member 10 connecting the pair of parallel legs 4 at the respective distal ends thereof. A flange 5 extends downwardly from the lateral member which can be disposed between an upright fixture of the kitchen sink, and one of a distal kitchen wall and a counter splashboard.

Figure 8:
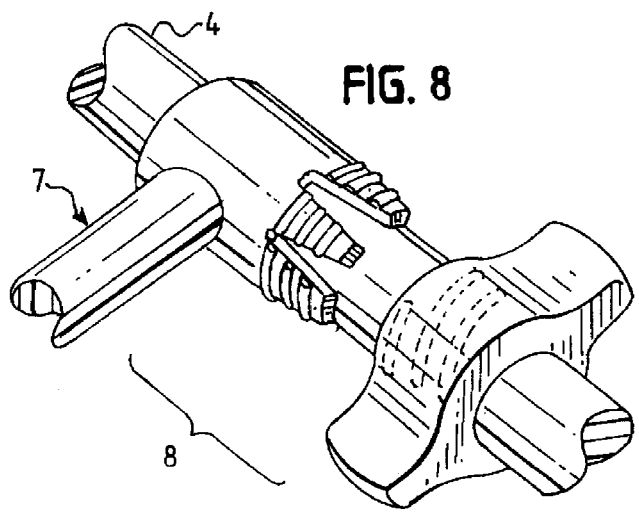
FIG. 8 is a fragmentary perspective view of the system for removably securing kitchen utensils over a kitchen sink of the present invention showing a tapering clamp for preventing the slidable bracket from sliding axially along the legs of the frame.
Figure 13:
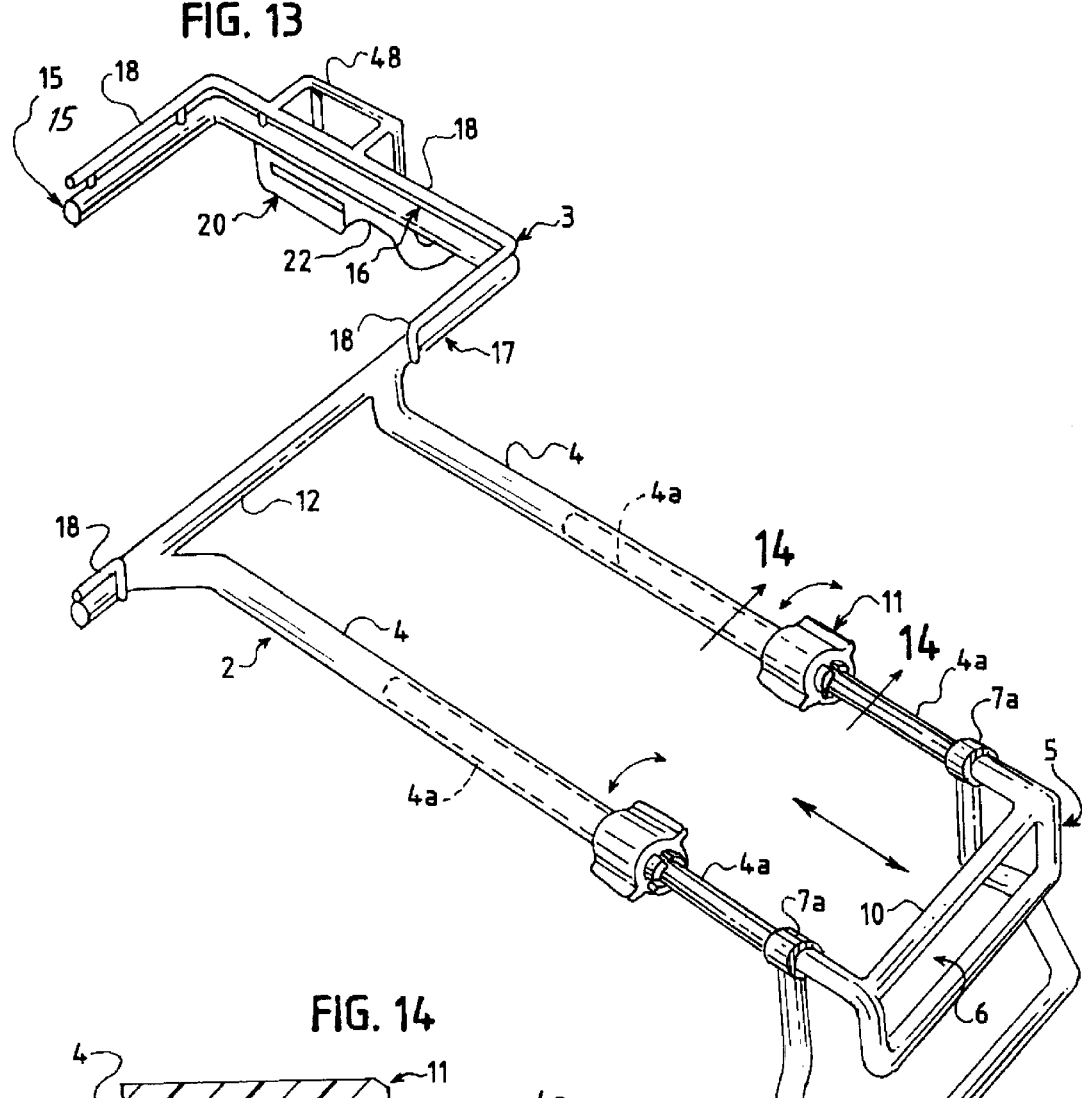
FIG. 13 is a perspective view of a preferred embodiment of the frame of the system for removably securing kitchen utensils over a kitchen sink of the present invention showing a slidable distal bracket for bracing the frame against a wall of the sink and further showing means for adjusting the frame length to accommodate varying sink sizes.
Figure 14:
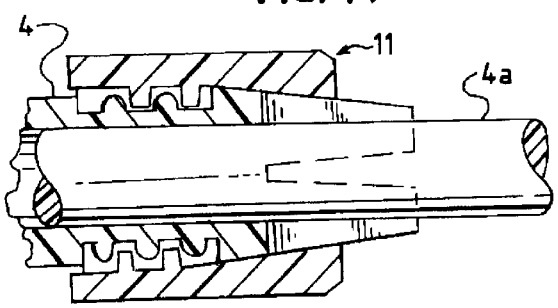
FIG. 14 is a cross-sectional view of a tapered fastener taken along the line 14—14 of FIG. 13 showing the means for securably adjusting the length of the legs relative to an inserted ends of an extension legs respectively disposed therein.

The pair of spaced apart parallel legs extend distally from opposite ends of a first segment 12 of the tray-like frame section 3. Preferably, at least one of the pair of spaced apart parallel legs 4 has a radially extending slidable bracket 7 that is moveable axially relative to the at least one of the pair of spaced apart parallel legs, as shown in FIG. 6. The slidable bracket further has a tapered clamp 8 to suppress axial movement, as best shown in FIG. 8. As will be readily apparent, the radially extending slidable bracket 7 can be moved to contact a vertical side wall of the kitchen sink and then locked to restrict further axial movement, thereby limiting longitudinal movement of the elongated frame. Referring to FIG. 13, a slidable distal bracket 21 for bracing the frame against a vertical wall of the kitchen sink is shown. The slidable distal bracket 21 is connected to the frame by a connecting ring 7a, which is slidable relative to the leg and may be secured to the leg by clamping as shown in FIGS. 7 and 8. Furthermore, means for adjusting the frame length to accommodate varying sink sizes is shown in said FIG. 13. The means for adjusting the frame length 11 includes adjusting the length of the legs by inserting ends of corresponding extension legs into the ends of the legs and securing the relative positions with a tapered fastener 11 as shown in FIG. 14.

Moreover, the radially extending slidable bracket 7 may be pivotally moveable about the axis of the at least one of the pair of spaced apart parallel legs from which it extends and means for restricting pivotal movement is thereby provided.

In the subject embodiment, the first segment 12 of the tray-like frame section, each of the pair of spaced apart parallel legs 4, and the lateral member 10 define a recess 14 for receiving at least one of the plurality of removably securable kitchen utensils independent of the generally planar board for cutting. The lateral member 10 can be extended over and around an upright fixture of the kitchen sink to limit longitudinal movement of the elongated frame.

Furthermore, the tray-like frame section 3 has a proximal border 15, a distal border 17 and a pair of interconnecting lateral borders 16, and a raised railing 18 extending along at least a portion of each border of the tray-like frame section for receiving the generally planar board for cutting. The tray-like frame section 3 also has a pair of downwardly extending braces 20 for supporting the proximal end of the elongated frame over a proximal member of the kitchen sink. Each of the braces has a bottom edge with a concave section 22 that is suitably sized to straddle the proximal member of the kitchen sink to limit longitudinal movement of the elongated frame, and the distal end of the elongated frame is disposed over a distal member of the kitchen sink. The distal member may include a portion of the counter top or edge thereof and the proximal rim of the sink.

Furthermore, this embodiment may include at least one preparation basket 34 having a rim flange 34a extending horizontally that is disposed in the recess 14 for receiving at least one of the plurality of removably securable kitchen utensils. The rim flange 34a has opposite lateral portions 34b that are adapted to be supported by the pair of spaced apart parallel legs 4, and each of the opposite lateral portions of the rim flange has an inverted channel 34c that is open along the bottom and with an inner cylindrical surface adapted to slidably receive one of the pair of spaced apart parallel legs.

The rim flange further has a proximal portion and the generally planar board for cutting has a first generally planar side and a second generally planar side, with each of the first generally planar side and second generally planar side having a surface recess 36 extending along a central portion of a distal edge that is suitably sized to receive the rim flange 34a disposed on a proximal end of the at least one preparation basket 34. The central portion of the distal edge further has a concavity 38 disposed therein that is suitably sized to receive the proximal end of the at least one preparation basket below the rim flange.

This embodiment of the system for removably securing kitchen utensils over a kitchen sink of the present invention may further comprise a draining basket 46 with open latticed walls 46a and a horizontal shelf 46b extending proximally from a rim thereof. The draining basket can be disposed at a spaced distance from the cutting board 1, sufficient to allow any waste materials from an upper surface of the cutting board to be directed off the cutting board and into the kitchen sink free of obstruction by the draining basket. The draining basket 46 comprises a pair of bowls 46c interconnected by a horizontal bridge 46d suitably sized to straddle a section of the pair of spaced apart parallel legs 4.

The embodiments of the system for removably securing kitchen utensils over a kitchen sink of the present invention may be constructed on any material suited to the purpose, such as wood, metal, plastic, or the like.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims. Those skilled in the art will appreciate that the conception upon which this disclosure is base, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It will be appreciated by one skilled in the art that the system of this invention could be used in various locations throughout the kitchen other than over the kitchen sink. The frame would require only the addition of non-slip footings and the system could be installed on a counter or table. A drip pan or tray could be placed underneath the system to collect drainage and waste.

My invention resides not in any one of these features per se, but rather in the particular combinations of some or all of them herein disclosed and claimed and it is distinguished from the prior art in these particular combinations of some or all of its structures for the functions specified.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A system for removably securing kitchen utensils over a kitchen sink comprising:
   a. a generally planar board for cutting;
   b. a draining basket with open latticed walls and a horizontal shelf extending proximally from a rim thereof; and
   c. means for usably securing simultaneously, over a kitchen sink, a plurality of utensils including the generally planar board for cutting and the draining basket, wherein the draining basket is disposed at a spaced distance from the cutting board,
   whereby, waste materials from an upper surface of the cutting board can be directed off the cutting board, between the cutting board and the draining basket, and into the kitchen sink free of obstruction by the draining basket.

2. A system for removably securing kitchen utensils over a kitchen sink comprising:
   a. a plurality of removably securable kitchen utensils including a generally planar board for cutting; and
   b. an elongated frame having a proximal end and a distal end with a frame section for supporting a cutting board disposed adjacent to the proximal end thereof and a pair of horizontal, spaced apart, parallel legs extending distally from the frame section, said elongated frame further has a lateral member connecting the pair of parallel legs at the respective distal ends thereof,
      i. the pair of spaced apart parallel legs extends distally from opposite ends of a first segment of the frame section,
      ii. the first segment of the frame section, each leg of the pair of spaced apart parallel legs, and the lateral member define a recess for receiving at least one of the plurality of removably securable kitchen utensils independent of the generally planar board for cutting,
      iii. said frame section has a proximal border, a distal border and a pair of interconnecting lateral borders, and a raised railing extending along at least a portion of each border of the frame section for receiving the generally planar board for cutting and a pair of downwardly extending braces for supporting the proximal end of the elongated frame over a proximal member of the kitchen sink, and
      iv. the distal end of the elongated frame is disposed over a distal member of the kitchen sink.

3. The system for removably securing kitchen utensils over a kitchen sink of claim 2, wherein each of the pair of downwardly extending braces has a bottom edge with a concave section that is suitably sized to straddle a proximal member of the kitchen sink to limit longitudinal movement of the elongated frame.

4. The system for removably securing kitchen utensils over a kitchen sink of claim 2, wherein the lateral member can extend over and around an upright fixture of the kitchen sink to limit longitudinal movement of the elongated frame, said upright fixture comprising at least one of a faucet handle, a spout, and a nozzle with an extensible flexible hose.

5. The system for removably securing kitchen utensils over a kitchen sink of claim 2, wherein the elongated frame has a flange extending downwardly from the lateral member, said flange can be disposed between an upright fixture of the kitchen sink, and one of a distal kitchen wall and a counter splashboard.

6. The system for removably securing kitchen utensils over a kitchen sink of claim 5, wherein the flange extending downwardly from the lateral member has an aperture which can receive a protuberance of the upright fixture.

7. The system for removably securing kitchen utensils over a kitchen sink of claim 2, wherein at least one leg of the pair of spaced apart parallel legs has a radially extending slidable bracket that is moveable axially relative to said at least one leg of the pair of spaced apart parallel legs, said slidable bracket further has a tapered clamp to suppress axial movement, whereby, the radially extending slidable bracket can be moved to contact a vertical side wall of the kitchen sink and then locked to restrict further axial movement, thereby limiting longitudinal movement of the elongated frame.

8. The system for removably securing kitchen utensils over a kitchen sink of claim 7, wherein the radially extending slidable bracket is pivotally moveable about the axis of the at least one leg of the pair of spaced apart parallel legs from which it extends and means for restricting pivotal movement are provided.

9. The system for removably securing kitchen utensils over a kitchen sink of claim 2, wherein the generally planar board for cutting has a first generally planar side and a second generally planar side with a rotatable spit disposed thereon.

10. The system for removably securing kitchen utensils over a kitchen sink of claim 9, wherein the rotatable spit is disposed on a central region of the second generally planar side of the cutting board and the second generally planar side has a plurality of interconnected drain grooves disposed thereon that terminate proximate a distal edge of the cutting board, said plurality of interconnected drain grooves includes a series of centrally disposed drain grooves bounding the central region for collecting and transferring any draining liquid from the central region thereof.

11. The system for removably securing kitchen utensils over a kitchen sink of claim 9, wherein the first generally planar side has a uniform raised surface.

12. The system for removably securing kitchen utensils over a kitchen sink of claim 2, further comprising at least one preparation basket, having a rim flange extending horizontally, disposed in the recess for receiving at least one of the plurality of removably securable kitchen utensils, said rim flange having opposite lateral portions that are adapted to be supported by the pair of spaced apart parallel legs.

13. The system for removably securing kitchen utensils over a kitchen sink of claim 12, wherein each of the opposite lateral portions of the rim flange has an inverted channel that is open along the bottom and with an inner cylindrical surface adapted to slidably receive one of the pair of spaced apart parallel legs.

14. The system for removably securing kitchen utensils over a kitchen sink of claim 12, wherein said rim flange has a proximal portion and the generally planar board for cutting has a first generally planar side and a second generally planar side, each of said first generally planar side and second generally planar side has a surface recess extending along a central portion of a distal edge, each of said surface recesses is suitably sized to receive the rim flange disposed on a proximal end of the at least one preparation basket, said central portion of the distal edge further has a concavity disposed therein, and said concavity is suitably sized to receive the proximal end of the at least one preparation basket below the rim flange.

15. The system for removably securing kitchen utensils over a kitchen sink of claim 2, further comprising a draining basket with open latticed walls and a horizontal shelf extending proximally from a rim thereof, said draining basket being disposed at a spaced distance from the cutting board, whereby, waste materials from an upper surface of the cutting board can be directed off the cutting board, between the cutting board and the draining basket, and into the kitchen sink free of obstruction by the draining basket.

16. The system for removably securing kitchen utensils over a kitchen sink of claim 15, wherein the draining basket comprises a pair of bowls interconnected by a horizontal bridge suitably sized to straddle a section of the pair of spaced apart parallel legs.

17. The system for removably securing kitchen utensils over a kitchen sink of claim 16, wherein the draining basket further comprises a pair of spaced apart, proximally extending, parallel horizontal arms, said arms are at a spaced arm distance equivalent to a spaced legs distance between the pair of spaced apart parallel legs, whereby, a suitably sized preparation basket having a rim flange extending horizontally with opposite lateral portions can be supported by said arms of the draining basket.

18. The system for removably securing kitchen utensils over a kitchen sink of claim 17, wherein the elongated frame further comprises at least one of a holder for seasoning containers, a knife sheath, a grater and a slicer.

19. A system for removably securing kitchen utensils over a kitchen sink comprising:

a. a plurality of removably securable kitchen utensil including a generally planar board for cutting that has a first generally planar side and a second generally planar side with a rotatable spit disposed on a central region of the second generally planar side of the cutting board and the second generally planar side has a plurality of interconnected drain grooves disposed thereon that terminate proximate a distal edge of the cutting board, said plurality of interconnected drain grooves includes a series of centrally disposed drain grooves bounding the central region for collecting and transferring any draining liquid from the central region thereof; and b. an elongated frame having a proximal end and a distal end with a frame section for supporting a cutting board disposed adjacent to the proximal end thereof and a pair of horizontal, spaced apart, parallel legs extending distally from the frame section, said elongated frame further has a lateral member connecting the pair of parallel legs at the respective distal ends thereof; a flange extends downwardly from the lateral member, said flange can be disposed between an upright fixture of the kitchen sink, and one of a distal kitchen wall and a counter splashboard;

i. the pair of spaced apart parallel legs extends distally from opposite ends of a first segment of the frame section, at least one leg of the pair of spaced apart parallel legs has a radially extending slidable bracket that is moveable axially relative to said at least one leg of the pair of spaced apart parallel legs, said slidable bracket further has a tapered clamp to suppress axial movement, whereby, the radially extending slidable bracket can be moved to contact a vertical side wall of the kitchen sink and then locked to restrict further axial movement, thereby limiting longitudinal movement of the elongated frame;

the radially extending slidable bracket is pivotally moveable about the axis of the at least one of the pair of spaced apart parallel legs from which it extends and means for restricting pivotal movement is provided, ii. the first segment of the frame section, each leg of the pair of spaced apart parallel legs, and the lateral member define a recess for receiving at least one of the plurality of removably securable kitchen utensils independent of the generally planar board for cutting; said lateral member extends over and around an upright fixture of the kitchen sink to limit longitudinal movement of the elongated frame, iii. said frame section has a proximal border, a distal border and a pair of interconnecting lateral borders, and a raised railing extending along at least a portion of each border of the frame section for receiving the generally planar board for cutting and a pair of downwardly extending braces for supporting the proximal end of the elongated frame over a proximal member of the kitchen sink, each of said braces has a bottom edge with a concave section that is suitably sized to straddle the proximal member of the kitchen sink to limit longitudinal movement of the elongated frame; and iv. the distal end of the elongated frame/is disposed over a distal member of the kitchen sink.

20. The system for removably securing kitchen utensils over a kitchen sink of claim 19, further comprising at least one preparation basket having a rim flange extending horizontally, disposed in the recess for receiving at least one of the plurality of removably securable kitchen utensils, said rim flange having opposite lateral portions that are adapted to be supported by the pair of spaced apart parallel legs, and wherein each of the opposite lateral portions of the rim flange has an inverted channel that is open along the bottom and with an inner cylindrical surface adapted to slidably receive one leg of the pair of spaced apart parallel legs; and said rim flange has a proximal portion and the generally planar board for cutting has a first generally planar side and a second generally planar side, each of said first generally planar side and second generally planar side has a surface recess extending along a central portion of a distal edge, each of said surface recesses is suitably sized to receive the rim flange disposed on a proximal end of the at least one preparation basket, said central portion of the distal edge further has a concavity disposed therein, and said concavity is suitably sized to receive the proximal end of the at least one preparation basket below the rim flange.

21. The system for removably securing kitchen utensils over a kitchen sink of claim 19, further comprising a draining basket with open latticed walls and a horizontal shelf extending proximally from a rim thereof, said draining basket being disposed at a spaced distance from the cutting board, and wherein the draining basket comprises a pair of bowls interconnected by a horizontal bridge suitably sized to straddle a section of the pair of spaced apart parallel legs, whereby, waste materials from an upper surface of the cutting board can be directed off the cutting board, between the cutting board and the draining basket, and into the kitchen sink free of obstruction by the draining basket.

22. The system for removably securing kitchen utensils over a kitchen sink of claim 19, wherein the pair of spaced apart parallel legs has a longitudinally extending, slidable distal bracket that is moveable axially relative to said at least one leg of the pair of spaced apart parallel legs, said slidable bracket further has a tapered clamp to suppress axial movement, whereby, the longitudinally extending slidable distal bracket can be moved to contact a distal vertical side wall of the kitchen sink and then locked to restrict further axial movement, thereby limiting longitudinal movement of the elongated frame.

23. The system for removably securing kitchen utensils over a kitchen sink of claim 19, wherein the pair of spaced apart parallel legs is extensible to accommodate varying sizes of kitchen sinks.

\* \* \* \* \*